(12) United States Patent
Shingu et al.

(10) Patent No.: US 12,360,481 B2
(45) Date of Patent: Jul. 15, 2025

(54) ENDLESS BELT, BELT UNIT, AND IMAGE FORMING APPARATUS

(71) Applicant: FUJIFILM Business Innovation Corp., Tokyo (JP)

(72) Inventors: Kenta Shingu, Kanagawa (JP); Satoya Sugiura, Kanagawa (JP); Yusuke Watanabe, Kanagawa (JP); Toshiyasu Yukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 414 days.

(21) Appl. No.: 18/152,165

(22) Filed: Jan. 10, 2023

(65) Prior Publication Data

US 2023/0242358 A1 Aug. 3, 2023

(30) Foreign Application Priority Data

Jan. 31, 2022 (JP) .................................. 2022-013009

(51) Int. Cl.
*G03G 15/16* (2006.01)
*B32B 25/00* (2006.01)
(Continued)

(52) U.S. Cl.
CPC ....... *G03G 15/1685* (2013.01); *B32B 25/047* (2013.01); *B32B 27/20* (2013.01);
(Continued)

(58) Field of Classification Search
CPC ............. G03G 15/162; G03G 15/1605; G03G 15/1685; G03G 15/167; G03G 2215/1623; B65H 2404/27; B65H 2404/28; B65H 2801/06; B65G 2812/02178; B32B 25/00; B32B 25/042; B32B 25/047; B32B 25/08; B32B 25/12; B32B 25/14; B32B 27/00; B32B 27/06; B32B 27/08; B32B 27/18; B32B 27/20; B32B 27/28; B32B 2413/00; B32B 2433/00; B32B 2433/02; B32B 2433/04
(Continued)

(56) References Cited

U.S. PATENT DOCUMENTS 5,965,235 A * 10/1999 McGuire ................... B31F 1/07
264/293
2005/0118361 A1* 6/2005 Natori ................ G03G 15/1685
428/32.72
(Continued)

FOREIGN PATENT DOCUMENTS

JP 2006071832 3/2006
JP 2010128311 6/2010

*Primary Examiner* — Robert B Beatty
(74) *Attorney, Agent, or Firm* — JCIPRNET (57) ABSTRACT

An endless belt includes a base material layer, the base material layer containing a polymer material and conductive particles, wherein in a section of the base material layer in a thickness direction, the conductive particles have an area ratio of 9.0% or more and 14.5% or less, an average value of areas of Delaunay triangles taking centers of gravity of the conductive particles as vertices is 0.10 μm² or more and 0.90 μm² or less, and a standard deviation of the areas is 0.010 μm² or more and 0.080 μm² or less.

9 Claims, 3 Drawing Sheets

(51) Int. Cl.
*B32B 25/04* (2006.01)
*B32B 27/00* (2006.01)
*B32B 27/20* (2006.01)

(52) U.S. Cl.
CPC ........ *G03G 15/167* (2013.01); *B32B 2413/00* (2013.01); *G03G 2215/1623* (2013.01)

(58) Field of Classification Search
USPC ................................ 399/302, 303, 308, 313
See application file for complete search history.

(56) References Cited

U.S. PATENT DOCUMENTS

| | | | |
|---|---|---|---|
| 2006/0280909 A1* | 12/2006 | Kien ...................... | D21H 27/02 428/156 |
| 2011/0293824 A1* | 12/2011 | Aoto .................. | G03G 15/1605 399/302 |
| 2014/0178110 A1* | 6/2014 | Yagi ..................... | G03G 15/162 399/302 |
| 2022/0308504 A1* | 9/2022 | Kojima ................ | G03G 15/162 |
| 2023/0244160 A1* | 8/2023 | Watanabe ................. | F16G 1/21 399/162 |

* cited by examiner

ENDLESS BELT, BELT UNIT, AND IMAGE FORMING APPARATUS

CROSS-REFERENCE TO RELATED APPLICATIONS

This application is based on and claims priority under 35 USC 119 from Japanese Patent Application No. 2022-013009 filed on Jan. 31, 2022.

BACKGROUND

(i) Technical Field

The present disclosure relates to an endless belt, a belt unit, and an image forming apparatus.

(ii) Related Art

JP2010-128311A discloses a belt tubular body for an image forming apparatus, the belt tubular body including a base material having an inner surface and an outer surface facing each other, wherein the base material contains at least an insulating resin and a conductive agent, and the inner surface has a region of a conductive metal oxide or a metal.

JP2006-071832A discloses a semiconductive belt including a belt base material, the belt base material containing two or more different elastic materials and a conductive additive, wherein an elastic material area ratio PS represented by a formula $1:(A/(A+B))\times100$ satisfies $19\%\leq PS\leq61\%$, $0.6\ \mu m^2\leq a\leq1.2\ \mu m^2$, and $0.3\ \mu m^2\leq b\leq0.9\ \mu m^2$, where a is an average area of domains per elastic material, A is a total number of domains of all the elastic materials, b is an average area of domains per aggregate of the conductive additive, and B is a total number of domains of all the aggregates of the conductive additive when a 100 $\mu m^2$ region on a section of the belt base material is observed in a section direction with a TEM and its section state is subjected to image analysis.

SUMMARY

Aspects of non-limiting embodiments of the present disclosure relate to an endless belt with which an image formed on a recording medium has excellent image quality and in which cracking due to repeated deformation during use is unlikely to occur, when used as a transfer unit that transfers a toner image onto the recording medium, as compared with an endless belt in which the conductive particles have an area ratio of more than 14.5% in a section of the base material layer in a thickness direction or with an endless belt in which a standard deviation of areas of Delaunay triangles taking centers of gravity of the conductive particles as vertices is less than 0.010 $\mu m^2$ or more than 0.080 $\mu m^2$ in a section of the base material layer in a thickness direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt including a base material layer, the base material layer containing a polymer material and conductive particles, wherein in a section of the base material layer in a thickness direction, the conductive particles have an area ratio of 9.0% or more and 14.5% or less, an average value of areas of Delaunay triangles taking centers of gravity of the conductive particles as vertices is 0.10 $\mu m^2$ or more and 0.90 $\mu m^2$ or less, and a standard deviation of the areas is 0.010 $\mu m^2$ or more and 0.080 $\mu m^2$ or less.

DETAILED DESCRIPTION

Hereinafter, exemplary embodiments of the present disclosure will be described. The following description and Examples are provided to illustrate the exemplary embodiments and are not intended to limit the scope of the exemplary embodiments.

The upper limit or the lower limit in one numerical range in stepwise numerical ranges in the present disclosure may be replaced with the upper limit or the lower limit of another stepwise numerical range. The upper limit or the lower limit of any numerical range described in the present disclosure may be replaced with a value described in Examples.

In the present disclosure, the term "step" includes not only an independent step but also a step that cannot be clearly distinguished from other steps but achieves the purpose of the step.

When an exemplary embodiment is described with reference to the drawings in the present disclosure, the structure of the exemplary embodiment is not limited to the structure illustrated in the drawings. The sizes of the members in each drawing are conceptual sizes, and the relative relationship between the sizes of the members is not limited to that shown in the drawings.

In the present disclosure, each component may contain a plurality of corresponding substances. In the present disclosure, the amount of each component in a composition refers to, when there are a plurality of substances corresponding to each component in the composition, the total amount of the plurality of substances present in the composition unless otherwise specified.

<Endless Belt>

An endless belt according to an exemplary embodiment includes a base material layer containing a polymer material and conductive particles. The endless belt according to the exemplary embodiment may have a protective layer on at least one of the outer peripheral surface and the inner peripheral surface of the base material layer.

Figure 1:
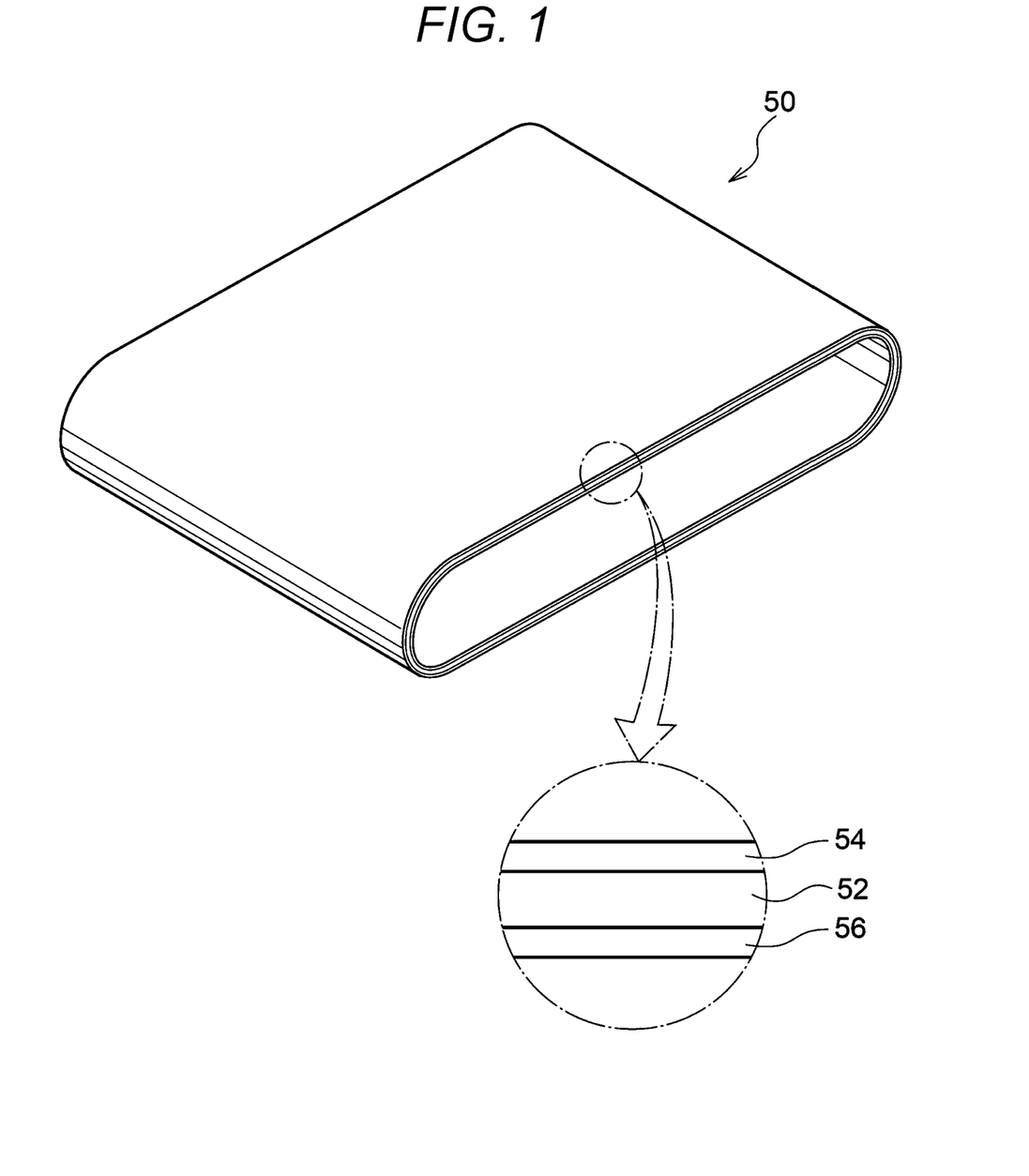
FIG. 1 is a schematic perspective view illustrating an example of an endless belt according to an exemplary embodiment of the present disclosure.

FIG. 1 is a schematic perspective view illustrating an example of the endless belt according to the exemplary embodiment. An endless belt 50 illustrated in FIG. 1 includes a base material layer 52, a protective layer 54, and a protective layer 56. The protective layer 54 is a layer provided on the outer peripheral surface of the base material layer 52, the protective layer constituting the outer peripheral surface of the endless belt 50. The protective layer 56 is a layer provided on the inner peripheral surface of the base material layer 52, the protective layer constituting the inner peripheral surface of the endless belt 50.

The endless belt according to the exemplary embodiment is incorporated into, for example, an electrophotographic image forming apparatus as a part of a transfer unit. The endless belt according to the exemplary embodiment is used as, for example, a secondary transfer belt or an intermediate transfer belt.

In a section of the base material layer in a thickness direction of the endless belt according to the exemplary embodiment, the area ratio of the conductive particles is 9.0% or more and 14.5% or less, the average value of the areas of Delaunay triangles taking the centers of gravity of the conductive particles as vertices is 0.10 μm$^2$ or more and 0.90 μm$^2$ or less, and the standard deviation of the areas is 0.010 μm$^2$ or more and 0.080 μm$^2$ or less.

When the endless belt according to the exemplary embodiment is used as a transfer unit that transfers a toner image onto a recording medium, the image formed on the recording medium has an excellent image quality, and cracking due to repeated deformation during use is unlikely to occur. The mechanism is assumed to be as follows.

An endless belt used as a transfer unit that transfers a toner image onto a recording medium desirably has a characteristic of clearly varying its electrical resistance depending on an applied voltage. For example, it is desired that there is a clear difference between the resistance value with an applied voltage of 500 V and the resistance value with an applied voltage of 1000 V. This difference causes the endless belt to have a relatively high resistance when the transfer unit is not in operation, resulting in a property to which toner is less likely to adhere. The endless belt has a relatively low resistance while the transfer unit is in operation, resulting in a property having excellent transfer performance. The transfer performance may be evaluated based on, for example, the density unevenness of the image.

Under the above-described circumstances, the endless belt according to the exemplary embodiment contains conductive particles (for example, carbon black) as a conductivity-imparting agent in the base material layer. The factors that control the voltage-dependent electrical resistance of the endless belt include the content and dispersion state of the conductive particles contained in the base material layer in addition to the type of the conductive particles contained in the base material layer. In the present exemplary embodiment, the content of the conductive particles is indicated by the area ratio of the conductive particles, and the dispersion state of the conductive particles is indicated by the average value and the standard deviation of the areas of Delaunay triangles taking the centers of gravity of the conductive particles as vertices.

When the area ratio of the conductive particles contained in the base material layer is less than 9.0%, the endless belt has too large resistance value, which is not suitable for a transfer unit that transfers a toner image onto a recording medium. When the area ratio of the conductive particles contained in the base material layer is more than 14.5%, the electric field dependence of the electrical resistance is small, which causes density unevenness due to re-adhesion of toner or the like. From this viewpoint, the area ratio of the conductive particles is 9.0% or more and 14.5% or less, preferably 10.0% or more and 13.0% or less, and more preferably 11.0% or more and 12.5% or less in a section of the base material layer in the thickness direction.

The average value of the areas of Delaunay triangles taking the centers of gravity of the conductive particles contained in the base material layer as vertices is 0.10 μm$^2$ or more and 0.90 μm$^2$ or less from the viewpoint of appropriately adjusting the interparticle distances of the conductive particles to exhibit conductivity. When the standard deviation is less than 0.010 μm$^2$, the electric field dependence of the electrical resistance is small, which causes density unevenness due to re-adhesion of toner. When the standard deviation exceeds 0.080 μm$^2$, cracking due to repeated deformation during use is likely to occur. From this viewpoint, the standard deviation of the areas of Delaunay triangles taking the centers of gravity of the conductive particles as vertices is 0.010 μm$^2$ or more and 0.080 μm$^2$ or less, preferably 0.013 μm$^2$ or more and 0.070 μm$^2$ or less, more preferably 0.015 μm$^2$ or more and 0.060 μm$^2$ or less, still more preferably 0.015 μm$^2$ or more and 0.040 μm$^2$ or less in a section of the base material layer in the thickness direction.

The area ratio of the conductive particles contained in the base material layer may be controlled by the size and addition amount of the conductive particles.

The average value and standard deviation of the areas of Delaunay triangles taking the centers of gravity of the conductive particles contained in the base material layer as vertices may be controlled by the addition amount of the conductive particles, the time for kneading the conductive particles and a polymer material, and the rotation number of stirring when the base material layer is produced. The longer the kneading time or the larger the rotation number of stirring, the smaller the standard deviation tends to be.

In the endless belt according to the exemplary embodiment, the difference between an area ratio AR1 of the conductive particles in a region from the outer peripheral surface of the base material layer to a depth of 200 μm (referred to as "first region") and an area ratio AR2 of the conductive particles in a region from a depth of 200 μm to a depth of 400 μm (referred to as "second region") is preferably 3.0% or less. With the difference between the AR1 and the AR2 of 3.0% or less, the difference in electrical resistance between the first region and the second region is relatively small, and thus abnormal discharge is unlikely to occur in the endless belt, and an image of excellent image quality is formed on a recording medium. From this viewpoint, the difference between the AR1 and the AR2 is more preferably 2.0% or less, still more preferably 1.5% or less, and still more preferably 1.0% or less, the lower the more preferable, and ideally 0%. Either the value of the AR1 or the AR2 may be larger than the other.

Hereinafter, a method for observing a section of the base material layer and a method for measuring geometric quantities will be described.

—Sample Production—

The endless belt is cut in the thickness direction parallel to the width direction by a cryo-microtome method to prepare section samples. The section samples are prepared at a total of 20 places of five places at equal intervals in the width direction of the endless belt (that is, evenly across the endless belt from the vicinity of one end to the vicinity of the other end) by four places at equal intervals in the circumferential direction.

Each cut section of the 20 section samples is observed with an atomic force microscope (AFM) to obtain phase images. In each of the 20 phase images, a rectangle having a size of the entire thickness direction×500 μm in the width direction is set in the base material layer, Otsu's binarization is performed in the region of the rectangular with image analysis software, and a dark portion (a region including a region having a small phase difference) is defined as a conductive particle.

—Area Ratio of Conductive Particle—

All the conductive particles (that is, dot-like dark portions) present in the rectangular region subjected to the binarization are set as the measurement targets. The area of each conductive particle is measured, the areas of all the conductive particles are summed up, and the area ratio of the conductive particles in the area of the rectangle is calculated. The same measurement is performed on the 20 phase images, and the area ratios of the 20 phase images are arithmetically averaged.

The area ratio AR1 of the conductive particles in the first region of the base material layer is obtained by performing the above-described measurement and calculation on the region from the outer peripheral surface of the base material layer to a depth of 200 μm in the region of the rectangle.

The area ratio AR2 of the conductive particles in the second region of the base material layer is obtained by performing the above-described measurement and calculation on the region from a depth of 200 μm to a depth of 400 μm of the base material layer in the region of the rectangle.

—Delaunay Triangulation—

A Delaunay triangulation is performed with the centers of gravity of all the conductive particles (that is, the dot-like dark portions) present in the binarized rectangular region taken as vertices. When the conductive particles are aggregated, the aggregate is regarded as one conductive particle, and the Delaunay triangulation is performed using the center of gravity of one aggregate as a vertex. The areas of all the formed Delaunay triangles are measured. The same measurement is performed on the 20 phase images, and the average value and standard deviation of the areas of the Delaunay triangles are calculated.

The center of gravity of a conductive particle is shown with x coordinate of the center of gravity=(total of $x_i$)/n and y coordinate of the center of gravity=(total of $y_i$)/n, where n is the number of pixels in the region of one conductive particle and $x_i$ and $y_i$ (i=1, n) are xy coordinates of each pixel.

Hereinafter, the layer structure and the materials of the endless belt according to the exemplary embodiment will be described in detail.

[Base Material Layer]

The base material layer is preferably a film or a sheet in which a polymer material contains conductive particles.

Examples of the polymer material include a rubber and a resin. The polymer materials may be used alone or combination.

Examples of the rubber include chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, and a mixed rubber of these rubbers.

Examples of the resin include polyamide, polyimide, polyamide imide, polyether imide, polyether ether ketone, polyphenylene sulfide, polyether sulfone, polyphenyl sulfone, polysulfone, polyethylene terephthalate, polybutylene terephthalate, polyacetal, polycarbonate, polyester, and a mixed resin of these resins.

Examples of the conductive particles include: carbon black such as Ketjen black, oil furnace black, channel black, and acetylene black; particles of metal such as aluminum and nickel; and particles of metal oxide such as indium tin oxide, tin oxide, zinc oxide, titanium oxide, and yttrium oxide. The conductive particles are preferably carbon black.

As the conductive particles, one type may be used alone, or two or more types may be used in combination.

The average primary particle diameter of the conductive particles is preferably 1 nm or more and 150 nm or less, more preferably 3 nm or more and 100 nm or less, and still more preferably 5 nm or more and 50 nm or less.

The base material layer may contain a conductive agent other than the conductive particles. Examples of the conductive agent include: ion conductive substances such as potassium titanate, potassium chloride, sodium perchlorate, and lithium perchlorate; and ion conductive polymers such as polyaniline, polyether, polypyrrole, polysulfone, and polyacetylene. These conductive agents may be used alone or combination.

The base material layer is preferably a conductive elastic layer containing a rubber and conductive particles, and more preferably a conductive elastic layer containing at least one of chloroprene rubber and epichlorohydrin rubber and carbon black.

The total content of the conductive particles and the conductive agent in the base material layer is preferably set based on the volume resistivity of the endless belt. The volume resistivity of the endless belt is preferably $1.0 \times 10^6$ Ω·cm or more and $1.0 \times 10^9$ Ω·cm or less.

In the exemplary embodiment, the volume resistivity (Ω·cm) is measured as follows.

The measurement environment is a temperature of 22° C. and a relative humidity of 55%. The sample is placed in the measurement environment for 24 hours or longer, in which the temperature and humidity are controlled. A micro ammeter (R8430A manufactured by Advantest Corporation) is used as the resistance meter, and a UR probe (manufactured by Mitsubishi Chemical Corporation) is used as the probe. The applied voltage is 1 kV, the application time is 5 seconds, and the load is 1 kgf. The measurement is performed at a total of 18 measurement points of six measurement points at equal intervals in the circumferential direction of the endless belt by three measurement points at the center and both ends in the width direction of the endless belt. The 18 measured values are arithmetically averaged.

When the base material layer contains carbon black, the content of the carbon black is preferably 5 parts by mass or more and 40 parts by mass or less relative to 100 parts by mass of the polymer material.

The base material layer may include additives such as antioxidants, crosslinking agents, flame retardants, coloring agents, surfactants, dispersants, and fillers.

The average thickness of the base material layer is preferably 400 μm or more, more preferably 420 μm or more, and still more preferably 440 μm or more from the viewpoint of the durability of the endless belt, and is preferably 800 μm or less, more preferably 600 μm or less, and still more preferably 500 μm or less from the viewpoint of the flexibility and bending resistance of the endless belt.

[Protective Layer]

The endless belt according to the exemplary embodiment may include a protective layer on at least one of the outer peripheral surface and the inner peripheral surface of the base material layer, and preferably includes a protective layer on the outer peripheral surface and the inner peripheral surface of the base material layer. The protective layer provided on the outer peripheral surface of the base material layer constitutes the outer peripheral surface of the endless belt. The protective layer provided on the inner peripheral surface of the base material layer constitutes the inner peripheral surface of the endless belt.

The protective layer is preferably a film or a sheet containing a polymer material.

Examples of the polymer material include the above-described rubber and resin described for the base material layer.

The protective layer preferably contains a urethane resin and fluorine-containing resin particles.

A urethane resin (also referred to as polyurethane or urethane rubber) is synthesized typically by polymerizing polyisocyanate and polyol. The urethane resin preferably has a hard segment and a soft segment.

As the fluorine-containing resin particles, for example, one type or more types of particles composed of any one of a tetrafluoroethylene resin, a trifluorochloroethylene resin, a hexafluoropropylene resin, a vinyl fluoride resin, a vinylidene fluoride resin, a difluorodichloroethylene resin, and a copolymer of these resins are preferable. Of them, tetrafluoroethylene resin particles are preferable as the fluorine-containing resin particles.

The average primary particle diameter of the fluorine-containing resin particles is preferably 5 nm or more and 300 nm or less, more preferably 8 nm or more and 200 nm or less, still more preferably 10 nm or more and 150 nm or less.

The protective layer may contain additives such as anti-oxidants, crosslinking agents, flame retardants, coloring agents, and fillers.

The average thickness of the protective layer on one surface of the base material layer is preferably 2 μm or more, more preferably 5 μm or more, still more preferably 10 μm or more from the viewpoint of the abrasion resistance of the protective layer, and is preferably 60 μm or less, more preferably 30 μm or less, still more preferably 20 μm or less from the viewpoint of the flexibility and bending resistance of the endless belt.

[Method for Producing Endless Belt]

Examples of a method for producing the endless belt include a production method including preparing a tubular member to be a base material layer and forming a protective layer on the outer peripheral surface or the inner peripheral surface of the tubular member.

Examples of the method for producing the tubular member include: extrusion molding including melting a composition containing a polymer material and conductive particles, extruding the molten composition in a belt shape from a die, and solidifying it; injection molding including melting a composition containing a polymer material and conductive particles, placing the molten composition in a belt-shaped mold, and solidifying it; and coating molding including applying a composition containing a precursor or monomer of a polymer material and conductive particles to a core body and solidifying the composition.

Examples of the method for forming the protective layer include: applying a liquid composition containing a polymer material and fluorine-containing resin particles to the outer peripheral surface or the inner peripheral surface of a tubular member and solidifying the liquid composition; and applying a liquid composition containing a precursor or monomer of a polymer material and fluorine-containing resin particles to the outer peripheral surface or the inner peripheral surface of a tubular member and solidifying the liquid composition. Drying, heating, electron beam irradiation, or ultraviolet irradiation may be performed depending on the type of the component to solidify the liquid composition.

<Belt Unit>

Figure 2:
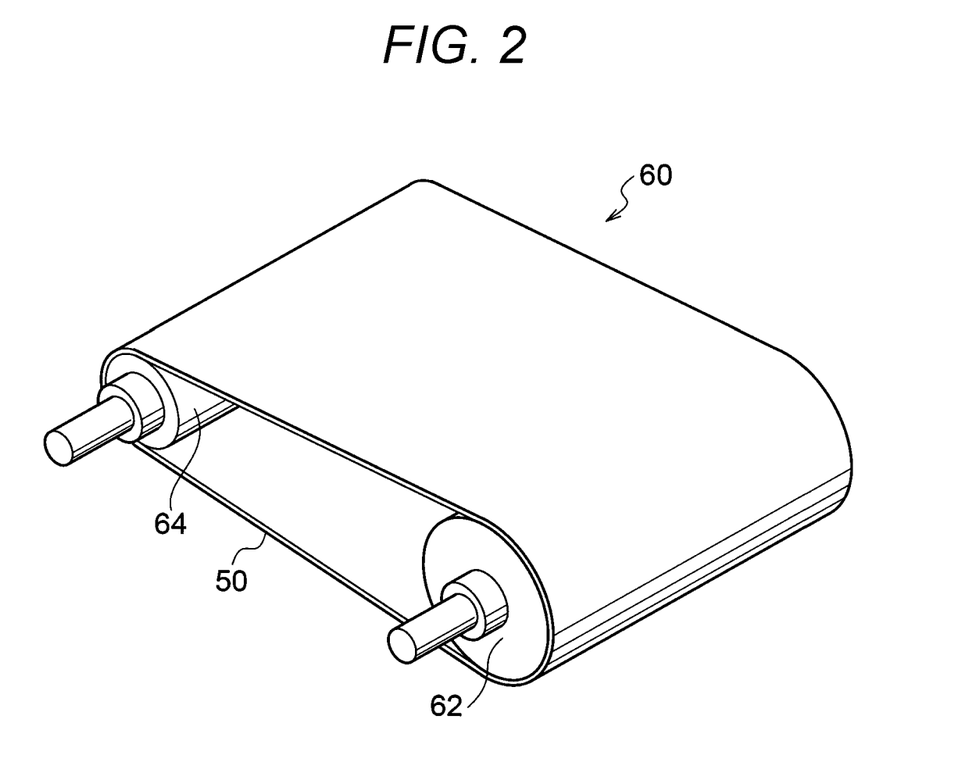
FIG. 2 is a schematic perspective view illustrating an example of a belt unit according to the exemplary embodiment.

FIG. 2 is a schematic perspective view illustrating an example of the belt unit according to the exemplary embodiment.

A belt unit 60 is illustrated as a schematic perspective view illustrating a state in which the endless belt is wound around a plurality of roller members. The belt unit 60 includes the endless belt 50, a drive roller 62, and a support roller 64. The belt unit has a form in which the endless belt 50 is wound around the drive roller 62 and the support roller 64 under tension (hereinafter, the form is also referred to as "stretched"). The drive roller 62 rotates with the power of a drive unit (not illustrated) connected to the drive roller 62. The endless belt 50 and the support roller 64 rotate following the rotation of the drive roller 62.

The belt unit 60 is incorporated in an electrophotographic image forming apparatus as a part of a transfer unit. The belt unit 60 is suitable for a secondary transfer belt unit. The number of roller members over which the endless belt 50 is stretched in the belt unit 60 is not limited to two, and may be three or more.

<Image Forming Apparatus>

An image forming apparatus according to the exemplary embodiment includes a photoreceptor, a charging unit that charges a surface of the photoreceptor, an electrostatic charge image forming unit that forms an electrostatic charge image on the charged surface of the photoreceptor, a developing unit that contains a developer containing a toner and develops the electrostatic image formed on the surface of the photoreceptor with the developer to form a toner image, and a transfer unit that includes the belt unit according to the exemplary embodiment and transfers the toner image onto a recording medium. The transfer unit includes, for example, an intermediate transfer body, a primary transfer unit that transfers a toner image onto a surface of the intermediate transfer body, and a secondary transfer unit that transfers the toner image transferred to the surface of the intermediate transfer body onto a recording medium, wherein the secondary transfer unit includes the belt unit according to the exemplary embodiment.

The image forming apparatus according to the exemplary embodiment may further include: a fixing unit that fixes the toner image transferred to the surface of the recording medium; a photoreceptor cleaning unit that cleans the surface of the photoreceptor after the toner image is transferred and before the photoreceptor is charged; and a charge eliminating unit that irradiates the surface of the photoreceptor with charge eliminating light after the toner image is transferred and before the photoreceptor is charged. In the image forming apparatus according to the exemplary embodiment, a part including the developing unit may have a cartridge structure (process cartridge) attachable to and detachable from the image forming apparatus.

Hereinafter, an example of the image forming apparatus according to the exemplary embodiment will be described, but the present invention is not limited to the example. In the following description, main parts illustrated in the drawings will be described, and description of other parts will be omitted.

Figure 3:
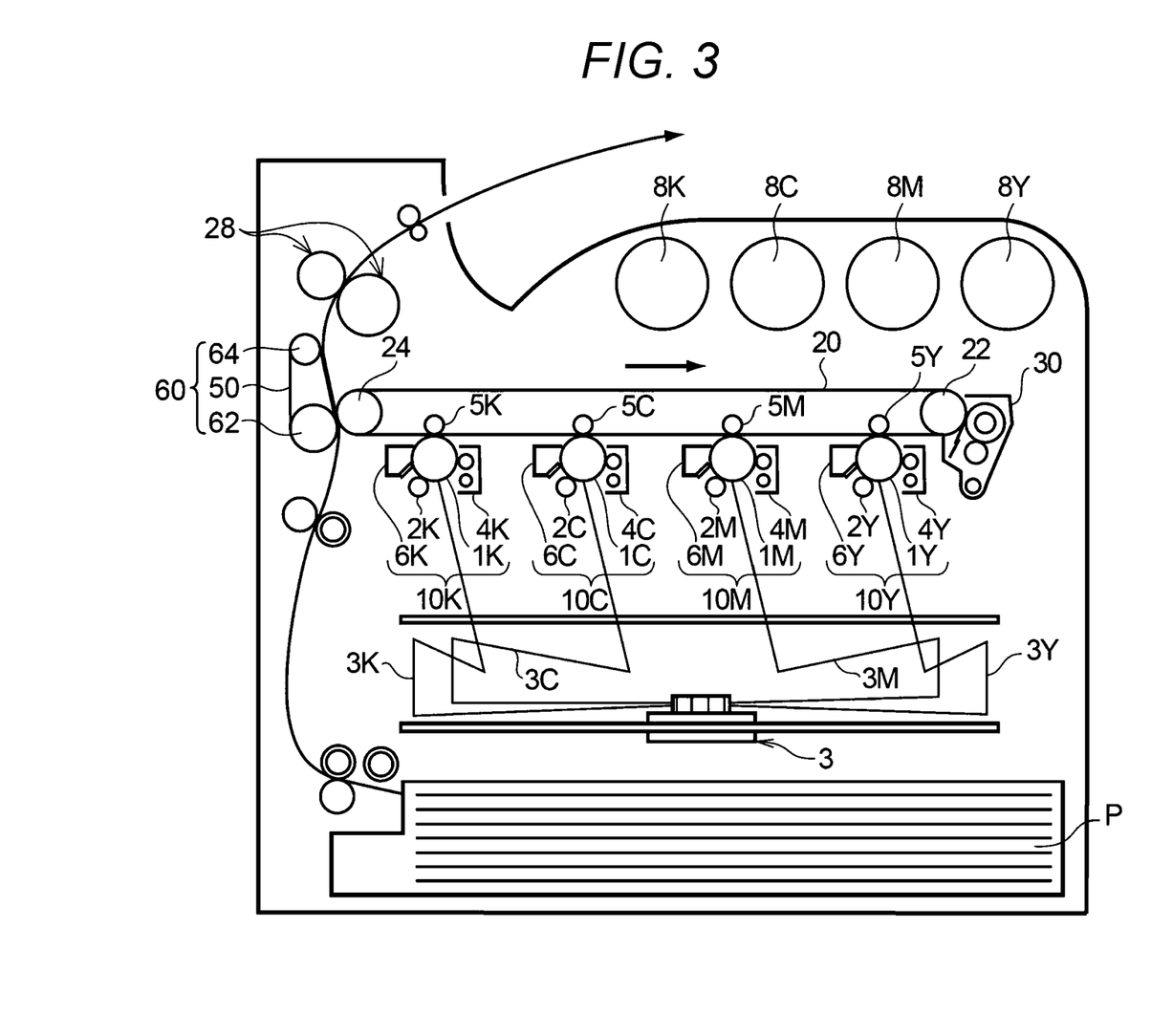
FIG. 3 is a schematic configuration diagram illustrating an example of an image forming apparatus according to the exemplary embodiment.

FIG. 3 is a schematic configuration diagram illustrating an example of the image forming apparatus according to the exemplary embodiment.

The image forming apparatus illustrated in FIG. 3 includes first to fourth electrophotographic image forming units 10Y, 10M, 10C, and 10K (image forming units) that respectively output yellow (Y), magenta (M), cyan (C), and black (K) color images based on color-separated image data. These image forming units (hereinafter may also be simply referred to as "units") 10Y, 10M, 10C, and 10K are arranged apart from each other at predetermined intervals in the horizontal direction. These units 10Y, 10M, 10C, and 10K may be process cartridges attachable to and detachable from the image forming apparatus.

An intermediate transfer belt (an example of the intermediate transfer body) 20 is disposed above the units 10Y, 10M, 10C, and 10K to extend through each unit. The intermediate transfer belt 20 is wound around a drive roller 22 and a support roller 24 that are disposed in contact with the inner surface of the intermediate transfer belt 20 and runs in the direction from the first unit 10Y toward the fourth unit 10K. A force is applied to the support roller 24 in the direction away from the drive roller 22 with a spring or the like (not illustrated), so that a tension is applied to the intermediate transfer belt 20 wound around the two rollers. On the image holding surface side of the intermediate transfer belt 20, an intermediate transfer belt cleaning device 30 is provided facing the drive roller 22.

Developing devices (examples of developing units) 4Y, 4M, 4C, and 4K of the units 10y, 10M, 10C, and 10K are respectively supplied with yellow, magenta, cyan, and black toners contained in the toner cartridges 8Y, 8M, 8C, and 8K.

Since the first to fourth units 10Y, 10M, 10C, and 10K have the same configuration and operation, the first unit 10Y disposed upstream in the running direction of the intermediate transfer belt that forms a yellow image will be described as a representative example.

The first unit 10Y has a photoreceptor 1Y. The photoreceptor 1Y is surrounded by, in sequence, a charging roller (an example of the charging unit) 2Y that charges the surface of the photoreceptor 1Y to a predetermined potential, an exposure device (an example of the electrostatic charge image forming unit) 3 that exposes the charged surface to a laser beam 3Y based on a color-separated image signal to form an electrostatic charge image, a developing device (an example of the developing unit) 4Y that supplies charged toner to the electrostatic charge image to develop the electrostatic charge image, a primary transfer roller (an example of the primary transfer unit) 5Y that transfers the developed toner image onto the intermediate transfer belt 20, and a photoreceptor cleaning device 6Y that removes toner remaining on the surface of the photoreceptor 1Y after the primary transfer.

The primary transfer roller 5Y is disposed on the inner side of the intermediate transfer belt 20 to face the photoreceptor 1Y. The primary transfer rollers 5Y, 5M, 5C, and 5K in the units are connected to respective bias power supplies (not illustrated) that apply a primary transfer bias.

The belt unit 60 is a belt unit including the endless belt 50 (an example of the endless belt according to the exemplary embodiment). The belt unit 60 includes the endless belt 50, the drive roller 62, and the support roller 64. The belt unit 60 is disposed on the outer side of the intermediate transfer belt 20 to face the support roller 24. The belt unit 60 is connected to a bias power supply (not illustrated) that applies a secondary transfer bias.

Hereinafter, an operation of the first unit 10Y in forming a yellow image will be described.

First, prior to the operation, the charging roller 2Y charges the surface of the photoreceptor 1Y to a potential of −600 V to −800 V.

The photoreceptor 1Y includes a conductive (for example, a volume resistivity of $1 \times 10^{-6}$ Ω·cm or less at 20° C.) base material and a photosensitive layer stacked on the base material. The photosensitive layer usually has high resistance (resistance of a common resin), but irradiation with a laser beam changes the specific resistance of a region of the photosensitive layer irradiated with the laser beam. For this, the charged surface of the photoreceptor 1Y is irradiated with the laser beam 3Y from the exposure device 3 according to image data for yellow sent from a control unit (not illustrated). This causes an electrostatic charge image with a yellow image pattern to form on the surface of the photoreceptor 1Y.

The electrostatic charge image is an image formed on the surface of the photoreceptor 1Y through charging, and it is a so-called negative latent image formed when the specific resistance of an irradiated part of the photosensitive layer is reduced by the laser beam 3Y, charges on the surface of the photoreceptor 1Y flow, and charges in a part that is not irradiated with the laser beam 3Y remain.

The electrostatic charge image formed on the photoreceptor 1Y rotates up to a predetermined developing position as the photoreceptor 1Y runs. At this developing position, the electrostatic charge image on the photoreceptor 1Y is developed and visualized as a toner image by the developing device 4Y.

The developing device 4Y contains, for example, an electrostatic charge image developer containing at least yellow toner and a carrier. The yellow toner is triboelectrically charged by being stirred in the developing device 4Y, and is held on a developer roller (an example of a developer holding body) having charges with the same polarity (negative polarity) as the charges on the photoreceptor 1Y. As the surface of the photoreceptor 1Y passes through the developing device 4Y, the yellow toner electrostatically adheres to the charge-eliminated latent image part on the surface of the photoreceptor 1Y, and a latent image is developed by the yellow toner. The photoreceptor 1Y on which the yellow toner image is formed continuously runs at a predetermined speed to convey the developed toner image on the photoreceptor 1Y to a predetermined primary transfer position.

When the yellow toner image on the photoreceptor 1Y is conveyed to the primary transfer position, a primary transfer bias is applied to the primary transfer roller 5Y, an electrostatic force from the photoreceptor 1Y toward the primary transfer roller 5Y acts on the toner image, and the toner image on the photoreceptor 1Y is transferred onto the intermediate transfer belt 20. The transfer bias applied at this time has (+) polarity opposite to the polarity (−) of the toner. The transfer bias is controlled to, for example, +10 μA in the first unit 10Y by the control unit (not illustrated).

The primary transfer biases applied to the primary transfer rollers 5M, 5C, and 5K in the second unit 10M and the subsequent units are also controlled in the same manner as in the first unit.

In this manner, the intermediate transfer belt 20 on which the yellow toner image has been transferred in the first unit 10Y is sequentially conveyed through the second to fourth units 10M, 10C, and 10K, and the toner images of the respective colors are multiply transferred in a superimposed manner.

The intermediate transfer belt 20 onto which the toner images of the four colors have been multiply transferred through the first to fourth units reaches a secondary transfer part including the intermediate transfer belt 20, the support roller 24, and the belt unit 60. A recording paper (an example of the recording medium) P is fed to a gap between the belt unit 60 and the intermediate transfer belt 20 in contact with each other through a supply mechanism at a predetermined timing, and a secondary transfer bias is applied to the support roller 24. The transfer bias applied at this time has the same polarity (−) as the polarity (−) of the toner. An electrostatic force from the intermediate transfer belt 20 toward the recording paper P acts on the toner image, whereby the toner image on the intermediate transfer belt 20 is transferred onto the recording paper P. The secondary transfer bias at this time is determined according to the resistance detected by a resistance detection unit (not illustrated) that detects the resistance of the secondary transfer part. The voltage for the secondary transfer bias is controlled.

The recording paper P onto which the toner image has been transferred is sent to a pressure contact part (nip part) between a pair of fixing rollers in a fixing device (an example of the fixing unit) 28, and the toner image is fixed to the recording paper P to form a fixed image. The recording paper P to which the color image has been fixed is sent toward an ejection part, and a series of color image forming operations ends.

Examples of the recording paper P onto which the toner image is transferred include plain paper used in electrophotographic copying machines, printers, and the like. Examples of the recording medium include OHP sheets in addition to the recording paper P.

Example S

Hereinafter, exemplary embodiments will be described more specifically by way of Examples, but exemplary embodiments are not limited to the following Examples. The synthesis, treatment, production, and the like were performed at room temperature (25° C.±3° C.) unless otherwise specified.

Endless belts of Examples 1 to 25 and Comparative Examples 1 to 20 described in Table 1 were produced. The endless belts of Examples 1 to 25 and Comparative Examples 1 to 20 were produced using the same materials, but the area ratio of the conductive particles contained in the base material layer and the average value and standard deviation of the areas of the Delaunay triangles were varied by increasing or decreasing the addition amount of the materials and the kneading time of the materials.

The area ratio of the conductive particles was controlled by increasing or decreasing the addition amount of carbon black. The average value and standard deviation of the areas of the Delaunay triangles were controlled with the time for kneading carbon black and rubber material and the rotation number of stirring.

Hereinafter, Example 18 will be specifically described as a representative example.

Example 18

[Production of Base Material Layer]

A conductive rubber material containing carbon black in chloroprene rubber was mixed with ethylene propylene diene rubber, the resulting material was extruded with a kneading extruder and subjected to hot air drying, whereby a tubular body having a diameter (outer diameter) of 40 mm and an average thickness of 450 μm was obtained. The tubular body was cut to have a length of 355 mm and used as a base material.

[Production of Protective Layer]

To a polytetrafluoroethylene (PTFE)—containing urethane resin (Bonderite T862A, Henkel Japan Ltd.), 1 mass % of a curing agent (Loctite WH-1, Henkel Japan Ltd.) was added, and the mixture was diluted with water to prepare a coating liquid.

The coating liquid was sprayed over the outer peripheral surface of the base material while the base material was rotated with the central axis of the base material in the horizontal direction. Next, hot air drying was performed at a temperature of 150° C. for 35 minutes to form a protective layer having an average thickness of 10 μm on the outer peripheral surface of the base material. Subsequently, the same coating liquid was sprayed over the inner peripheral surface of the base material, and hot air drying was performed in the same manner to form a protective layer having an average thickness of 10 μm on the inner peripheral surface of the base material.

An endless belt having protective layers on both surfaces of the base material layer was thus obtained.

Endless belts of Examples 18-1 to 18-4 described in Table 2 were produced.

The endless belt of Example 18-1 is the same endless belt as the endless belt of Example 18.

The endless belts of Examples 18-2 to 18-4 are endless belts in which the same materials as in Example 18-1 (that is, Example 18) were used, but a difference |AR1−AR2| between the area ratio AR1 of the conductive particles in the first region and the area ratio AR2 of the conductive particles in the second region was slightly changed by changing the temperature of hot air drying of the coating liquid on the outer peripheral surface.

<Section Observation of Base Material Layer>

According to the method described above, a section sample of each endless belt was produced, and the area ratio of the conductive particles contained in the base material layer and the average value and standard deviation of the areas of Delaunay triangles taking the conductive particles as the vertices were determined.

<Performance Evaluation of Endless Belt>

[Voltage Dependence of Resistance Value]

The endless belt was placed in an environment of a temperature of 22° C. and a relative humidity of 55% for 24 hours or more to perform temperature control and humidity control. Under the same temperature and humidity environment, a resistance value (unit: log (Ω)) was measured under the measurement conditions of an applied voltage of 500 V or 1,000 V, an application time of 5 seconds, and a load of 1 kgf using a micro ammeter (R8430A, Advantest Corporation) and a UR probe (Mitsubishi Chemical Corporation). The measurement was performed at a total of 18 points of three points at the center and both ends of the endless belt in the width direction by six points at equal intervals in the circumferential direction. The measured values at 18 points for each of the applied voltages 500 V and 1,000 V were arithmetically averaged, and the difference between the average value of the applied voltage of 500 V and the average value of the applied voltage of 1,000 V was classified as follows.

A: 1 or more of difference
B: 0.8 or more and less than 1 of difference
C: less than 0.8 of difference

[Image Quality—Density Unevenness—]

The transfer performance of the endless belt was evaluated based on the image density unevenness.

The endless belt according to each of Examples and Comparative Examples was mounted on an image forming apparatus Versa 3100i Press (manufactured by Fuji Xerox Co., Ltd.) as a secondary transfer belt. The image forming apparatus was placed in an environment at a temperature of 22° C. and a relative humidity of 55% for 24 hours or more, and a magenta halftone image having an image density of 30% was formed on one entire surface of A3 size paper in the same environment. The image density of the halftone image was measured with a density measuring device X-Rite 404 (X-Rite Inc.). The measurement were performed at a total of nine points of three points at the center and both ends in the long side direction of the A3 size paper by three points at the center and both ends in the short side direction of the A3 size paper. The difference between the maximum value and the minimum value of the image density at the nine points was classified as follows.
  G1: less than 0.05 of difference
  G2: 0.05 or more and less than 0.15 of difference
  G3: 0.15 or more of difference

[Bending Resistance]

The endless belt was repeatedly bent using a bending tester under test conditions of a bending radius of 1 mm, a bending angle of ±135 degrees, and a bending speed of 175 reciprocations per minute. The surface of the endless belt was visually observed every 500,000 times of bending with one reciprocation as one time, and the time when cracking occurred was classified as follows.
  A: No cracking occurred after 2 million times of bending
  B: Cracking occurred at 2 million times of bending
  C: Cracking occurred at 1.5 million times or less of bending

TABLE 1

|  | Area ratio of conductive particles | Area of Delaunay triangles | | Performance evaluation | | |
| --- | --- | --- | --- | --- | --- | --- |
|  | Whole of base material layer % | Average value $\mu m^2$ | Standard deviation $\mu m^2$ | Voltage dependence of resistance value | Image quality | Bending resistance |
| Comparative Example 1 | 8.9 | 0.89 | 0.009 | C | G3 | A |
| Comparative Example 2 | 8.9 | 0.90 | 0.011 | C | G3 | A |
| Comparative Example 3 | 8.9 | 0.89 | 0.039 | C | G3 | A |
| Comparative Example 4 | 8.9 | 0.89 | 0.082 | C | G3 | A |
| Comparative Example 5 | 8.9 | 0.90 | 0.086 | C | G3 | B |
| Comparative Example 6 | 9.0 | 0.87 | 0.008 | C | G3 | A |
| Example 1 | 9.0 | 0.87 | 0.011 | B | G2 | A |
| Example 2 | 9.0 | 0.87 | 0.014 | B | G2 | A |
| Example 3 | 9.0 | 0.87 | 0.042 | B | G2 | A |
| Example 4 | 9.0 | 0.86 | 0.066 | B | G2 | B |
| Example 5 | 9.0 | 0.87 | 0.080 | B | G1 | B |
| Comparative Example 7 | 9.0 | 0.87 | 0.085 | A | G1 | C |
| Comparative Example 8 | 10.5 | 0.68 | 0.008 | C | G3 | A |
| Example 6 | 10.5 | 0.69 | 0.010 | B | G3 | A |
| Example 7 | 10.5 | 0.69 | 0.014 | B | G2 | A |
| Example 8 | 10.5 | 0.69 | 0.039 | B | G2 | A |
| Example 9 | 10.5 | 0.68 | 0.066 | B | G2 | B |
| Example 10 | 10.5 | 0.68 | 0.078 | A | G1 | B |
| Comparative Example 9 | 10.5 | 0.68 | 0.086 | A | G1 | C |
| Comparative Example 10 | 11.0 | 0.61 | 0.006 | C | G3 | A |
| Example 11 | 11.0 | 0.62 | 0.012 | B | G2 | A |
| Example 12 | 11.0 | 0.61 | 0.013 | A | G1 | A |
| Example 13 | 11.0 | 0.62 | 0.043 | A | G1 | B |
| Example 14 | 11.0 | 0.62 | 0.060 | A | G1 | B |
| Example 15 | 11.0 | 0.61 | 0.080 | A | G1 | B |
| Comparative Example 11 | 11.0 | 0.62 | 0.087 | A | G1 | C |
| Comparative Example 12 | 12.5 | 0.41 | 0.008 | C | G3 | A |
| Example 16 | 12.5 | 0.41 | 0.010 | B | G2 | A |
| Example 17 | 12.5 | 0.41 | 0.016 | A | G1 | A |
| Example 18 | 12.5 | 0.41 | 0.039 | A | G1 | A |
| Example 19 | 12.5 | 0.41 | 0.067 | A | G1 | B |
| Example 20 | 12.5 | 0.41 | 0.080 | A | G1 | B |
| Comparative Example 13 | 12.5 | 0.41 | 0.086 | A | G1 | C |
| Comparative Example 14 | 14.5 | 0.14 | 0.008 | C | G3 | A |
| Example 21 | 14.5 | 0.14 | 0.011 | B | G2 | B |
| Example 22 | 14.5 | 0.14 | 0.015 | B | G2 | B |
| Example 23 | 14.5 | 0.14 | 0.042 | B | G2 | B |
| Example 24 | 14.5 | 0.14 | 0.066 | B | G2 | B |
| Example 25 | 14.5 | 0.14 | 0.079 | A | G1 | B |
| Comparative Example 15 | 14.5 | 0.14 | 0.085 | A | G1 | C |
| Comparative Example 16 | 14.8 | 0.10 | 0.008 | C | G3 | B |
| Comparative Example 17 | 14.8 | 0.11 | 0.011 | C | G3 | C |
| Comparative Example 18 | 14.8 | 0.10 | 0.042 | C | G3 | C |
| Comparative Example 19 | 14.8 | 0.10 | 0.084 | B | G2 | C |
| Comparative Example 20 | 14.8 | 0.10 | 0.086 | B | G1 | C |

TABLE 2

| | Area ratio of conductive particles | | Area of Delaunay triangles | | Performance evaluation | | |
|---|---|---|---|---|---|---|---|
| | Whole of base material layer % | Difference between first region and second region \|AR1 − AR2\| % | Average value $\mu m^2$ | Standard deviation $\mu m^2$ | Voltage dependence of resistance value | Image quality | Bending resistance |
| Example 18-1 | 12.5 | 0.2 | 0.41 | 0.039 | A | G1 | A |
| Example 18-2 | 12.5 | 1.0 | 0.41 | 0.048 | A | G1 | A |
| Example 18-3 | 12.5 | 1.9 | 0.40 | 0.042 | B | G2 | A |
| Example 18-4 | 12.5 | 2.0 | 0.41 | 0.044 | C | G3 | A |

What is claimed is:

1. An endless belt comprising a base material layer, the base material layer containing a polymer material and conductive particles,
wherein in a section of the base material layer in a thickness direction, the conductive particles have an area percentage of 9.0% or more and 14.5% or less, an average value of areas of Delaunay triangles taking centers of gravity of the conductive particles as vertices is 0.10 $\mu m^2$ or more and 0.90 $\mu m^2$ or less, and a standard deviation of the areas is 0.010 $\mu m^2$ or more and 0.080 $\mu m^2$ or less.

2. The endless belt according to claim 1, wherein the standard deviation is 0.015 $\mu m^2$ or more and 0.040 $\mu m^2$ or less.

3. The endless belt according to claim 1, wherein the area percentage is 11.0% or more and 12.5% or less.

4. The endless belt according to claim 1, wherein in the section of the base material layer in the thickness direction, a difference between an area ratio of the conductive particles in a first region from an outer peripheral surface of the base material layer to a depth of 200 μm and an area percentage of the conductive particles in a second region from a depth of 200 μm to 400 μm of the base material layer is 3.0% or less.

5. The endless belt according to claim 1, wherein the conductive particles are carbon black.

6. The endless belt according to claim 1, further comprising a protective layer provided on at least one of an outer peripheral surface and an inner peripheral surface of the base material layer.

7. A belt unit comprising:
the endless belt according to claim 1; and
a plurality of roller members over which the endless belt is stretched under tension,
wherein the belt unit is attachable to and detachable from an image forming apparatus.

8. An image forming apparatus comprising:
a photoreceptor;
a charging unit that charges a surface of the photoreceptor;
an electrostatic charge image forming unit that forms an electrostatic charge image on the charged surface of the photoreceptor;
a developing unit that contains a developer containing a toner and develops, with the developer, the electrostatic charge image formed on the surface of the photoreceptor with the developer to form a toner image; and
a transfer unit that includes the belt unit according to claim 7 and transfers the toner image onto a recording medium.

9. The image forming apparatus according to claim 8, wherein the transfer unit further includes an intermediate transfer body, a primary transfer unit that transfers the toner image onto a surface of the intermediate transfer body, and a secondary transfer unit that transfers the toner image transferred onto the surface of the intermediate transfer body, onto a recording medium, wherein the second transfer unit includes the belt unit according to claim 7.

* * * * *